UNITED STATES PATENT OFFICE.

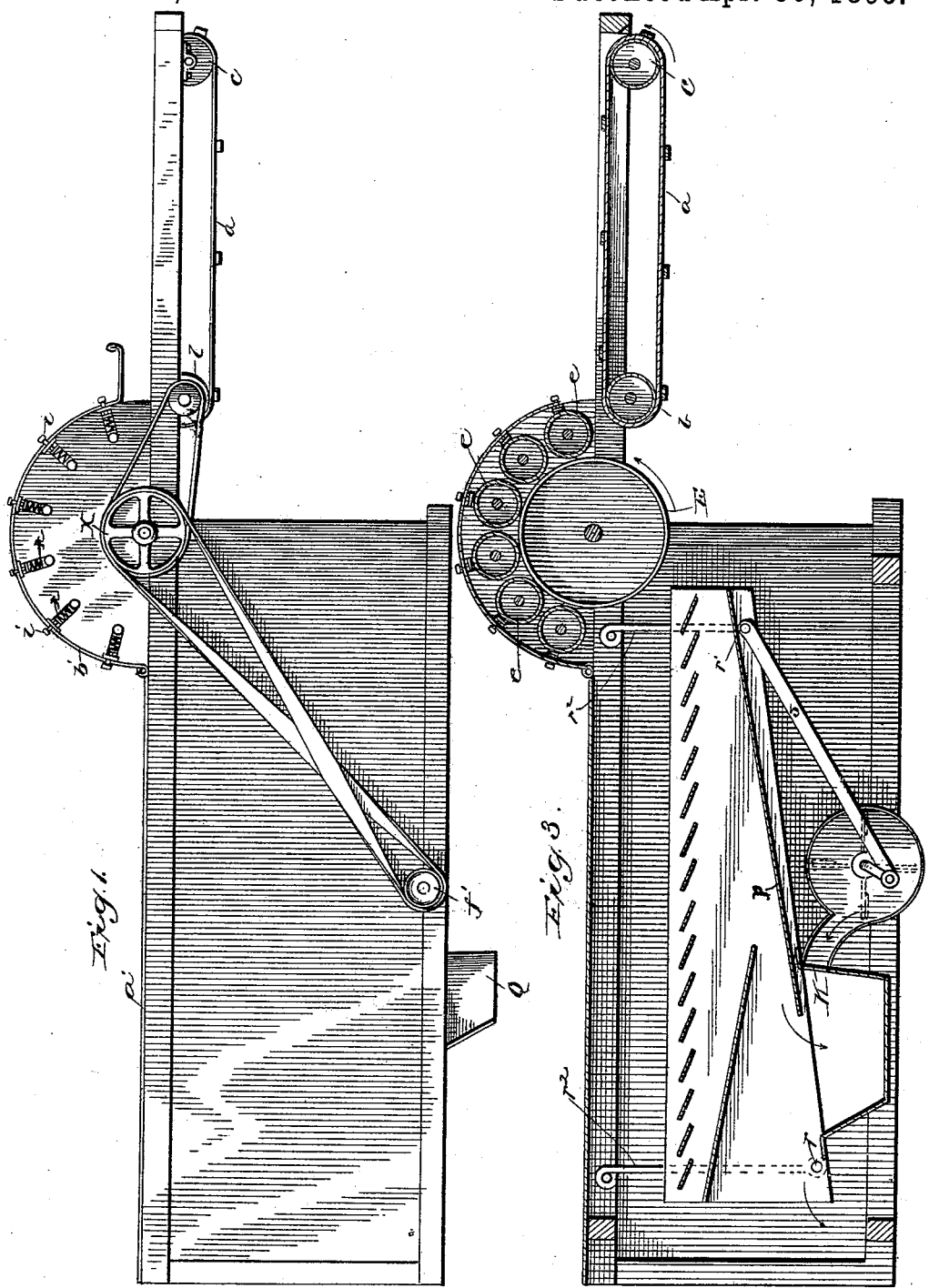

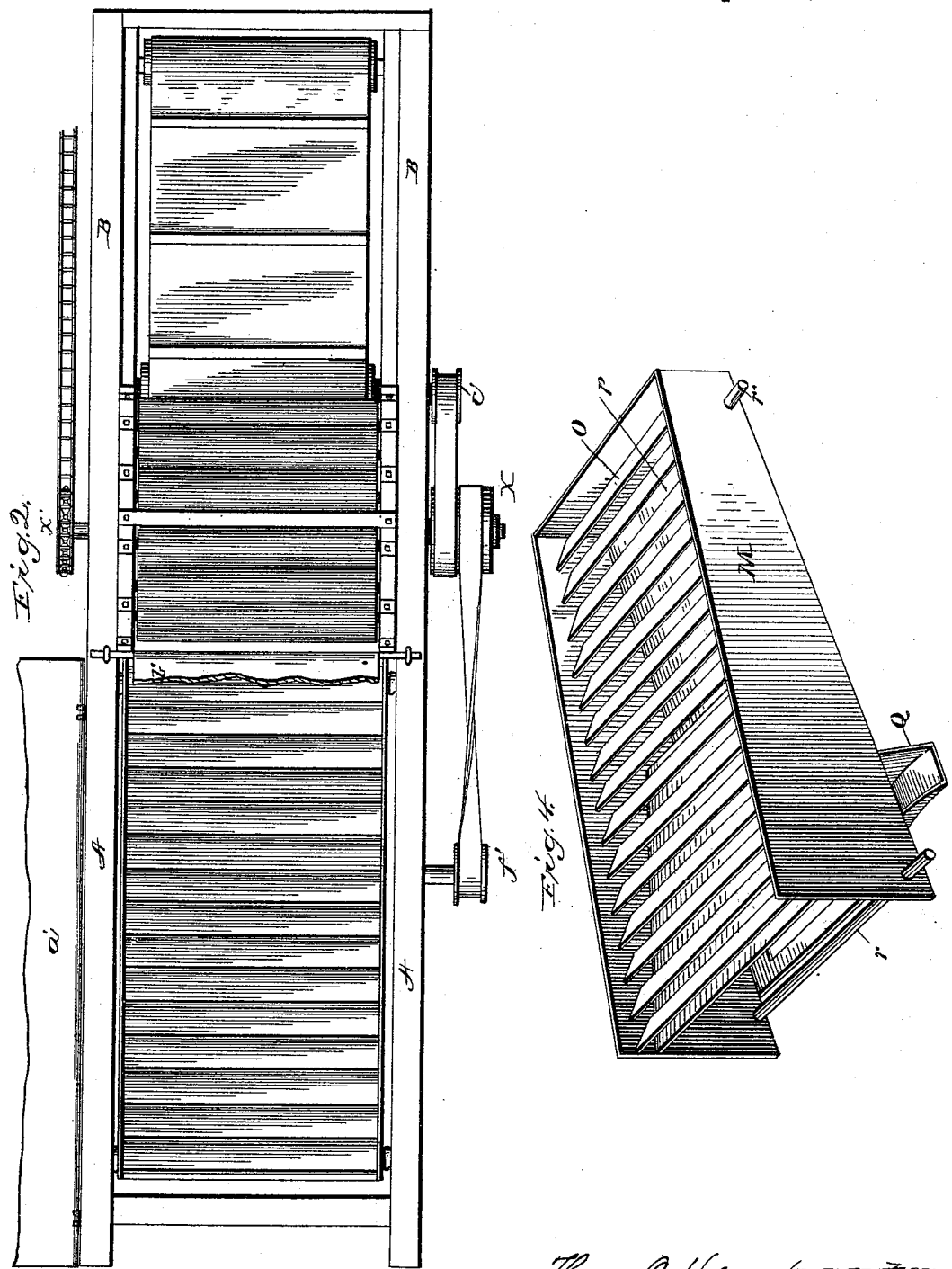

THOMAS O. HELGERSON, OF VOLGA, SOUTH DAKOTA.

FLAX-THRASHER.

SPECIFICATION forming part of Letters Patent No. 538,447, dated April 30, 1895.

Application filed September 20, 1893. Serial No. 486,019. (No model.)

*To all whom it may concern:*

Be it known that I, THOMAS O. HELGERSON, a citizen of the United States, residing at Volga, in the county of Brookings and State of South Dakota, have invented certain new and useful Improvements in Flax-Thrashers; and I do hereby declare the following to be a full, clear, and exact description of the invention, such as will enable others skilled in the art to which it appertains to make and use the same.

My invention relates to certain improvements in flax thrashers in which the thrasher is attached to the cutting machine, and the flax is thrashed in the field directly from the cutting machine. I attain this object by means of the mechanism set forth and described in the accompanying drawings, in which—

Figure 1 is a side elevation. Fig. 2 shows a top plan with the covers removed. Fig. 3 is a longitudinal section through the center. Fig. 4 gives a detail of the vibrator.

Similar letters refer to similar parts throughout the several views.

The improvement consists of a frame A having solid sides and open at the bottom but covered by a hinged lid or cover a' the continuation B, of the frame A, having a curved hinged cover b' and provided at either end with cylinders b and c over which passes the endless cleated apron a which conveys the flax to the rollers e e. The said cylinder b carries a pulley wheel c'. The small rollers e e revolve upon the large roller E, said small rollers e e being kept in position by means of springs k k k regulated by set screws i i i. The large roller E carries on one side a double pulley wheel x to which are connected by belts the pulley wheels c' and f', and upon the other side the large roller E carries a toothed wheel x' carrying a chain belt which gears upon a similar wheel on the cutting machine and the large roller E is thus made to revolve by power obtained from the cutting machine.

The vibrator M is made to vibrate to and fro within the frame A and is suspended by means of the rods $r^2$ $r^2$ attached at their lower ends to the rods r r' which pass through the bottom of the vibrator the upper ends of said rods $r^2$ $r^2$ having their ends bent around headed pins projecting from the inner sides of the frame A. To one of the rods r' is pivotally attached one end of the pitman s, and the other end is pivotally attached to the crank-shaft of the pulley wheel f'. Thus when the shaft t is made to revolve by means of the belt operating the pulley wheel f' the crank portion of the shaft t pushes the pitman s backward and forward and this pitman s being attached to the vibrator M a lateral motion is secured to the said vibrator M.

The top of the vibrator M is formed of rigid slats O O O arranged obliquely but at a sufficient distance apart to permit the seed of the flax falling through to the bottom of the vibrator, and yet catching the straw or stems of the flax and conveying it beyond the machine. The bottom p of the vibrator M is made slanting and is designed to throw the flax seed toward the grain spout Q in said bottom.

A fan can be placed below the vibrator M, between the grain spout Q and the roller E, and as the flax falls from the inclined bottom p of the vibrator M into the grain spout Q the chaff and stems can be blown out through the rear end of the vibrator M, the draft from the fan operating through the slot K in the grain spout Q.

This attachment can be used in connection with any cutting machine that elevates the cut flax by means of canvas aprons and the thrasher attachment is to be firmly attached to the frame work of the cutting machine and run by a chain belt geared upon the cutting machine.

The flax is carried by the apron a to the spring pressed rollers e e e where it is thrashed and falls through the oblique slats of the top of the vibrator M to the slanting bottom p of said vibrator M and thence out through the grain spout Q. The straw or stems fall from the rollers e e e upon the slatted top of the vibrator M and are thence conveyed out from the machine. By means of the mechanism before described the flax straw is thrashed thoroughly, and a minimum amount of seed is left in the straw.

Having described my invention, what I claim, and desire to secure by Letters Patent, is—

A flax thrasher consisting of a casing carrying a main drive shaft having a sprocket wheel at one end thereof by which it receives motion from an outside source, a thrashing cylinder mounted on said shaft, a series of spring-pressed cylinders mounted in radial relation thereto, and bearing upon the periphery of said thrashing cylinder, feed rollers having a feeding apron moving thereon and receiving motion by means of a belt connected to a pulley on the end of the main drive shaft, in combination with separating mechanism located in said casing consisting of a vibrating frame pivotally mounted on a swinging support and having tapering sides and angularly disposed parallel slats in the upper portion thereof slightly separated from each other, whereby the seed is permitted to fall through into a receptacle therefor located in the bottom part of said casing and the straw or stems are stopped, and means for reciprocating said vibrating frame consisting of a rod upon which the lower end of said frame is mounted having a pulley and a crank thereon, a pitman connecting said crank with the said swinging support, and a belt connecting said rod with the main drive shaft, whereby motion is transmitted from the latter, substantially as and for the purpose described.

In testimony whereof I have affixed my signature in presence of two witnesses.

THOMAS O. HELGERSON.

Witnesses:
W. M. WRIGHT,
MARTHA A. WRIGHT.